United States Patent
Tanaka et al.

(10) Patent No.: US 10,006,658 B2
(45) Date of Patent: Jun. 26, 2018

(54) UNIT ATTACHING DEVICE AND INDOOR UNIT

(71) Applicant: Mitsubishi Electric Corporation, Tokyo (JP)

(72) Inventors: Kenyu Tanaka, Tokyo (JP); Masahiko Takagi, Tokyo (JP); Makoto Kurihara, Tokyo (JP); Kiyoshi Yoshimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/027,274

(22) PCT Filed: Oct. 20, 2014

(86) PCT No.: PCT/JP2014/077822
§ 371 (c)(1),
(2) Date: Apr. 5, 2016

(87) PCT Pub. No.: WO2015/098256
PCT Pub. Date: Jul. 2, 2015

(65) Prior Publication Data
US 2016/0252270 A1    Sep. 1, 2016

(30) Foreign Application Priority Data

Dec. 26, 2013    (JP) .................................. 2013-270001
Jul. 3, 2014    (JP) .................................. 2014-137903

(51) Int. Cl.
*F24F 13/32*    (2006.01)
*F16B 5/06*    (2006.01)
(Continued)

(52) U.S. Cl.
CPC ............ *F24F 13/32* (2013.01); *F16B 5/0614* (2013.01); *F16M 13/027* (2013.01); *F16B 5/02* (2013.01); *F24F 2001/0037* (2013.01)

(58) Field of Classification Search
CPC .............. F24F 13/32; F24F 2001/0037; F16M 13/027; F16B 5/0614; F16B 5/02; E04B 9/006; Y10S 62/16
(Continued)

(56) References Cited

U.S. PATENT DOCUMENTS 3,766,750 A * 10/1973 Aoh ........................ F24F 13/20
                                                62/259.1
4,507,940 A *  4/1985 Sato ........................ F24D 5/04
                                                165/122
(Continued)

FOREIGN PATENT DOCUMENTS

CN       86 1 02055 A    12/1986
GB        2173292 A      10/1986
(Continued)

OTHER PUBLICATIONS

Australian Office Action dated Dec. 16, 2016 in the corresponding AU application No. 2014371802.
(Continued)

*Primary Examiner* — Patrick D Hawn
(74) *Attorney, Agent, or Firm* — Posz Law Group, PLC

(57) ABSTRACT

The unit attaching device of the present invention has suspension brackets that have a hole for passing a suspension bolt suspended from a ceiling and that are installed to an indoor unit that is a unit to be suspended. The suspension brackets are installed on the ceiling side of the side surface of a housing of the indoor unit. For example, when an earthquake or the like occurs, the distance between a part
(Continued)

that is the base point of the swing of the suspension bolt and the installation position of the unit can be reduced.

8 Claims, 6 Drawing Sheets

(51) Int. Cl.
  *F16M 13/02* (2006.01)
  *F16B 5/02* (2006.01)
  *F24F 1/00* (2011.01)
(58) Field of Classification Search
  USPC ........................................ 62/259.1, 285, 298
  See application file for complete search history.

(56) References Cited

U.S. PATENT DOCUMENTS

| | | | | |
|---|---|---|---|---|
| 4,660,389 | A * | 4/1987 | Kido | F24F 1/0007 62/263 |
| 4,702,087 | A * | 10/1987 | Nakajima | F24F 1/0007 62/285 |
| 4,979,559 | A * | 12/1990 | Dennis | F24F 13/32 165/67 |
| 5,027,614 | A * | 7/1991 | Mori | F24F 13/32 62/262 |
| 5,350,141 | A * | 9/1994 | Perrault | F16L 3/14 248/327 |
| 5,456,089 | A * | 10/1995 | O'Brien | B60H 1/3227 165/149 |
| 6,393,856 | B1 * | 5/2002 | Gunji | F24F 1/0011 62/259.1 |
| 6,457,692 | B1 * | 10/2002 | Gohl, Jr. | E04B 9/006 248/301 |
| 6,598,413 | B2 * | 7/2003 | Asahina | F24F 1/0011 62/259.1 |
| 7,320,453 | B2 * | 1/2008 | Berlyn | F24F 13/32 248/317 |
| 8,474,281 | B2 * | 7/2013 | Kumar | F24H 3/087 62/259.1 |
| 8,640,477 | B1 * | 2/2014 | Merideth | F24F 13/32 62/259.1 |
| 9,200,729 | B2 * | 12/2015 | Hobbs | F16L 59/135 |
| 2005/0189462 | A1 * | 9/2005 | Berlyn | F24F 13/32 248/317 |
| 2005/0229525 | A1 * | 10/2005 | Berlyn | E04B 9/006 52/506.06 |
| 2011/0174007 | A1 * | 7/2011 | Kumar | F24H 3/087 62/259.1 |
| 2014/0345735 | A1 * | 11/2014 | Hobbs | F16L 3/006 138/106 |
| 2016/0252270 | A1 * | 9/2016 | Tanaka | F16B 5/0614 211/118 |

FOREIGN PATENT DOCUMENTS

| | | |
|---|---|---|
| JP | S60-106026 U | 7/1985 |
| JP | H03-73834 U | 7/1991 |
| JP | H07-091735 A | 4/1995 |
| JP | H09-64562 A | 3/1997 |
| JP | 2011-169550 A | 9/2011 |
| JP | 2013-137150 A | 7/2013 |
| JP | 2013-224771 A | 10/2013 |
| JP | 5342057 B1 | 11/2013 |

OTHER PUBLICATIONS

Chinese Office Action dated Dec. 26, 2016 in the corresponding CN application No. 201410804422.4 (English translation attached).
Extended European Search Report dated Jul. 31, 2017 issued in corresponding EP application No. 14875283.5.
Office Action dated Jul. 4, 2017 issued in corresponding JP application No. 2014-137903 (and English translation).
Office Action dated Aug. 23, 2017 issued in corresponding CN patent application No. 201410804422.4 (and English ranslation).
International Search Report of the International Searching Authority dated Jan. 27, 2015 for the corresponding international application No. PCT/JP2014/077822 (and English translation).
Office Action dated Mar. 9, 2018 issued in corresponding AU patent application No. 2017202673.

\* cited by examiner

UNIT ATTACHING DEVICE AND INDOOR UNIT

CROSS REFERENCE TO RELATED APPLICATIONS

This application is a U.S. national stage application of International Application No. PCT/JP2014/077822 filed on Oct. 20, 2014, and is based on and claims priority to Japanese Patent Application No. 2013-270001 filed on Dec. 26, 2013 and Japanese Patent Application No. 2014-137903 filed on Jul. 3, 2014, the disclosures of which are incorporated herein by reference.

TECHNICAL FIELD

The present invention relates to a unit attaching device for installing a unit in such a manner that the unit is suspended from a ceiling or the like.

BACKGROUND ART

When a unit or the like is suspended from and fixed to a ceiling, a space above a ceiling, a beam, or the like of a building (hereinafter referred to as ceiling), for example, suspension bolts are attached to the ceiling, and the unit or the like is fixed to the suspension bolts. For example, in the case of an indoor unit installed on the indoor side of an air-conditioning apparatus, suspension brackets of the indoor unit are fixed to suspension bolts, and the indoor unit is suspended from a ceiling. Here, conventionally, the suspension brackets are often provided at positions on the lower side of the unit in the vertical direction (positions closer to the inside of a room (floor) when installed) (see, for example, Patent Literature 1).

CITATION LIST

Patent Literature

Patent Literature 1: Japanese Unexamined Patent Application Publication No. 2013-224771 (FIG. 2)

SUMMARY OF INVENTION

Technical Problem

Conventionally, when installing (attaching) an indoor unit to a building, if the distance between the ceiling and the unit is long, the suspension bolts swing largely, and may be broken. Even if braces are added to increase the strength, the suspension bolts swing about lower attachment parts of the braces, and may be broken. In some cases, the suspended unit may fall.

The present invention is made to solve the above problem, and it is an object of the present invention to provide a unit attaching device that can fix a suspension bolt and a unit to each other and can suppress the swing of the unit and the suspension bolt.

Solution to Problem

The unit attaching device according to the present invention has suspension brackets that have a hole for passing a suspension bolt suspended from a ceiling and that are installed to a unit to be suspended. The suspension brackets are installed on the ceiling side of the side surface of a housing of the unit.

Advantageous Effects of Invention

In the unit attaching device of the present invention, in a unit to be suspended by a suspension bolt, a suspension bracket is installed at a position on the ceiling side of the side surface of a housing of the unit. Therefore, when an earthquake or the like occurs, the distance between a part that is the base point of the swing of the suspension bolt and the installation position of the unit can be reduced, and the swing can be lessened.

DESCRIPTION OF EMBODIMENTS

Figure 1:
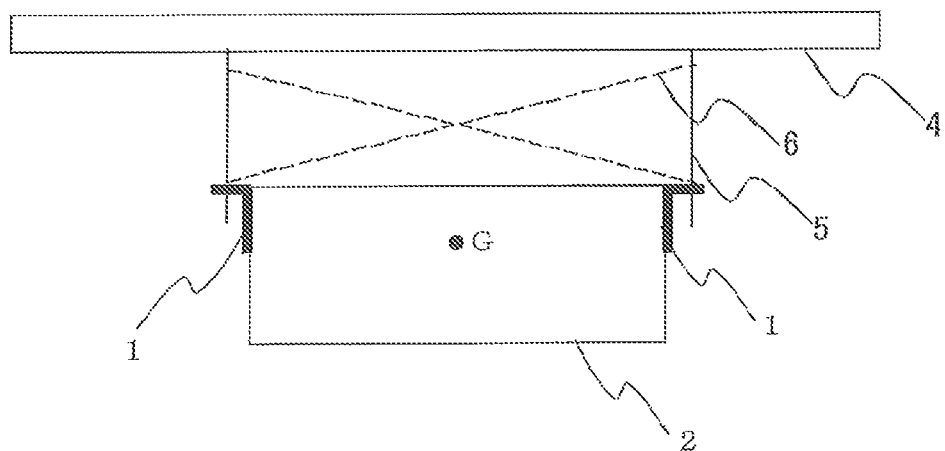
FIG. 1 is a diagram showing a state where a unit to which unit attaching devices of Embodiment 1 of the present invention are attached is attached to a ceiling.

An air-conditioning apparatus according to embodiments of the present invention will be described with reference to the drawings below. In the following drawings, elements denoted by the same reference signs are identical or equivalent, and this commonly applies to the entire description. In addition, the forms of components described in the entire description are merely illustrative and no restrictive. In particular, the combination of components is not restricted to the combination in each embodiment, and a component described in another embodiment can be applied to another embodiment. The upper side in the figures will be referred to as "the upper side," and the lower side in the figures will be referred to as "the lower side." When a plurality of units or the like of the same type distinguished by index letters need not be particularly distinguished or identified, the index letters may be omitted. In the drawings, the size relationship of components may be different from the actual one.

Embodiment 1

FIG. 1 is a diagram showing a state where a unit to which unit attaching devices of Embodiment 1 of the present invention are attached is attached to a ceiling. Here, a description will be given assuming that the unit to be suspended from the ceiling or the like is an indoor unit of an air-conditioning apparatus or the like. As shown in FIG. 1, the unit to be suspended in Embodiment 1 is a cassette-type indoor unit 2 that has a substantially rectangular parallelepiped housing (casing) and that is concealed and installed in a ceiling 4. For this reason, the lower surface of the indoor unit 2 faces the inside of a room that is an air-conditioned space, and has an air inlet and an air outlet. The indoor unit 2 has, for example, a heat exchanger that exchanges heat between refrigerant and air, and a fan that forms a flow of air sent from the air inlet through the heat exchanger to the air outlet (both not shown).

Suspension bolts 5 are attached and fixed to the ceiling 4 at one end. In Embodiment 1, suspension brackets 1 are installed at four locations on the indoor unit 2, and therefore four suspension bolts 5 are attached to and suspended from the ceiling 4. For example, when the distance between the ceiling 4 and the indoor unit 2 is long because of the installation position of the indoor unit 2, in view of the earthquake resistance, the suspension bolts 5 are connected and reinforced by braces 6 as shown in FIG. 1.

Figure 2:
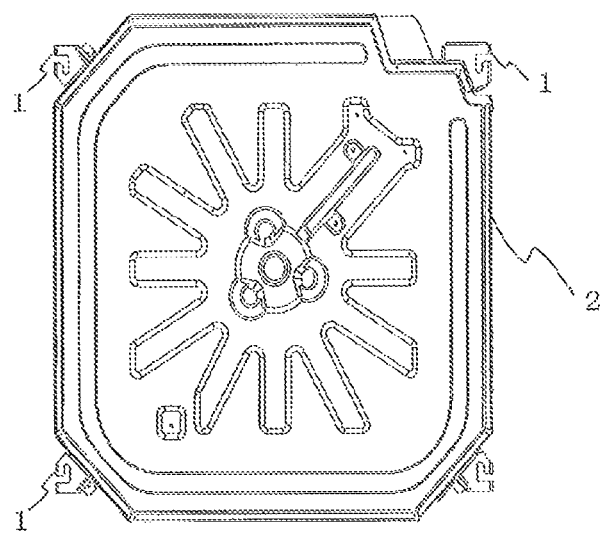
FIG. 2 is a diagram (1) illustrating suspension brackets 1 according to Embodiment 1 of the present invention.
Figure 3:
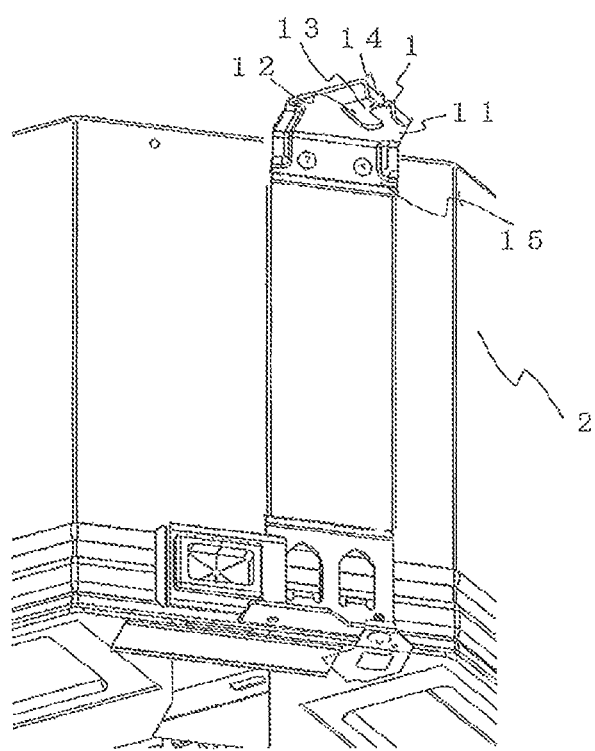
FIG. 3 is a diagram (2) illustrating suspension brackets 1 according to Embodiment 1 of the present invention.

FIG. 2 and FIG. 3 are diagrams illustrating suspension brackets 1 according to Embodiment 1 of the present invention. As shown in FIG. 2, the indoor unit 2 of Embodiment 1 has such a shape that the outer side surface is chamfered at four locations (four corners). The suspension brackets 1 are installed (fixed) to the indoor unit 2 in the chamfered parts of the indoor unit 2. Here, in Embodiment 1, the four suspension brackets 1 are all the same suspension brackets 1. The suspension brackets 1 form a part or the whole of unit attaching devices for fixing the indoor unit 2 (apparatus) to the suspension bolts 5. As shown in FIG. 1 and FIG. 3, in Embodiment 1, the suspension brackets 1 are installed at locations on the upper side (ceiling 4 side) in the direction of gravitational force (vertical direction) of the side surface of the housing of the indoor unit 2. For example, the suspension brackets 1 are preferably attached to positions higher than the position of the center of gravity G of the indoor unit 2 in the direction of gravitational force. Here, the suspension brackets 1 installed to the indoor unit 2 are connected to a drain pan (not shown) attached to the lower part of the inside of the body of the indoor unit 2, and support the drain pan. For this reason, FIG. 3 shows a suspension bracket 1 formed integrally with a part connected to the drain pan. However, the present invention is not restricted to this.

Here, although not particularly restricting the invention thereto, in Embodiment 1, flat portions 11 of the suspension brackets 1 and a top plate of the housing (the upper surface of the housing) of the indoor unit 2 are at substantially the same position in the height direction. The reason is that, for example, if the suspension brackets 1 are attached at positions higher than the upper surface of the housing, the suspension brackets 1 may get in the way in the transportation or the like of the indoor unit 2 (apparatus) before being suspended. The reason is also that, even if the suspension brackets 1 and the suspension bolts 5 are fixed to each other at positions higher than the indoor unit 2, the swing-suppressing effect is reduced if the distance between the fixation positions and the indoor unit 2 is too long.

As shown in FIG. 3, the flat portions 11 of the suspension brackets 1 have elongate holes 12 forming spaces through which the suspension bolts 5 are passed. In this embodiment, four suspension bolts 5 are passed through corresponding elongate holes 12. Due to the elongate holes 12, the degree of freedom of the suspension bolts 5 in the elongate holes 12 is increased. Therefore, after performing positioning relative to one of the suspension bolts 5, the positioning of the other suspension bolts 5 is facilitated. In addition, because play is provided, the deformation or the like of the suspension brackets 1 can be suppressed.

In Embodiment 1, the side surface of the flat portion 11 is cut to form a slit 13 that communicates with the elongate hole 12 and guides the suspension bolt the elongate hole 12. Due to the slit 13, the suspension bolt 5 can be easily guided to the elongate hole 12 from the side surface of the flat portion 11. After passing the suspension bolt 5 through the elongate hole 12, the suspension bracket 1 and the suspension bolt 5 are tightened and fixed to each other for example by a washer and a nut (not shown), and the indoor unit 2 and the suspension bolt 5 are thereby fixed to each other. A washer retaining portion 14 is formed on the side surface of the flat portion 11 in which slit 13 is cut. The washer retaining portion 14 is a claw that retains the washer attached to the suspension bolt 5 and prevents the suspension bolt 5 from coming off the slit 13. A vertical portion 15 has screw holes or the like and serves as an installation surface for installing the suspension bracket 1 to the indoor unit 2.

As described above, according to Embodiment 1, when fixing suspension bolts 5 suspended from a ceiling 4 and an indoor unit 2 (apparatus) to each other, by installing suspension brackets 1 that are unit attaching devices at positions on the upper side of the indoor unit 2 (for example, positions above the center of gravity G), the swing of the unit for example due to an earthquake can be suppressed. In general, the amplitude of the swing of a unit is proportional to the cube of the distance between the base point and the position of fixation to the unit. Therefore, if the distance between the ceiling 4 (if a brace 6 is provided, the lower attachment part of the brace 6) and the suspension brackets 1 is reduced if only slightly, the swing dramatically decreases. For this reason, the effect of installation of suspension brackets 1 on the upper side of an indoor unit 2 as in Embodiment 1 is large, and the earthquake resistance can be improved.

Embodiment 2

Figure 4:
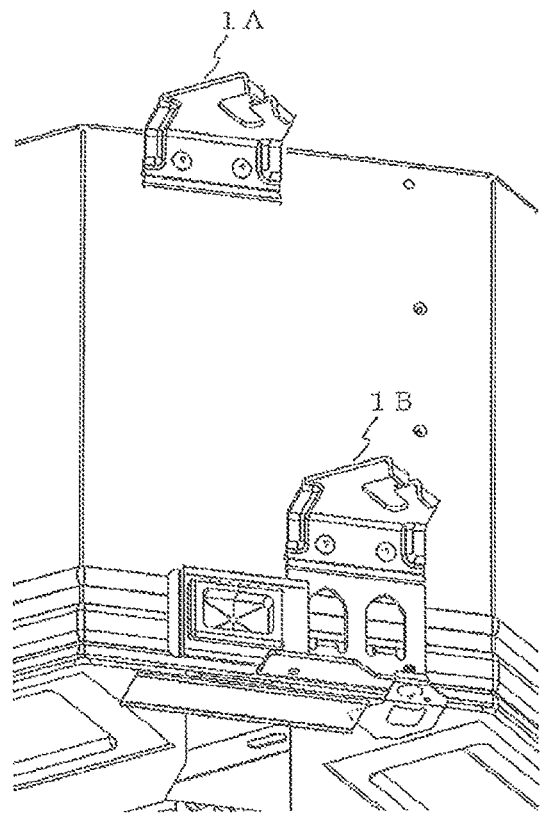
FIG. 4 is a diagram showing a unit to which unit attaching devices according to Embodiment 2 of the present invention are installed.

FIG. 4 is a diagram showing a unit to which unit attaching devices according to Embodiment 2 of the present invention are installed. In FIG. 4, unit or the like denoted by the same reference sign as in FIG. 1 to FIG. 3 performs the same operation or the like as Embodiment 1 . In FIG. 4, the suspension bracket 1A is a unit attaching device installed on the upper side of an indoor unit 2 (apparatus), and the suspension bracket 1B is a unit attaching device installed on the lower side (floor side, for example, below the center of gravity G of the indoor unit 2) of the indoor unit 2.

In Embodiment 1 described above, suspension brackets 1 that are unit attaching devices are installed on the upper side of an indoor unit 2. In Embodiment 2, suspension brackets 1 are installed not only on the upper side of an indoor unit 2 (apparatus) but also on the lower side (for example, below the center of gravity G). Because suspension brackets 1A and suspension brackets 1B installed on the upper side and the lower side of the four corners of the indoor unit 2 and suspension bolts 5 are fixed to each other, more secure fixation can be performed while improving the earthquake resistance. Here, in Embodiment 2, both the suspension brackets 1A and the suspension brackets 1B installed to the indoor unit 2 are fixed to the suspension bolts 5. However, the present invention is not restricted to this. For example, if secure fixation is ensured, only the suspension brackets 1A installed on the upper side may be fixed to the suspension bolts 5. For example, in a place where a ceiling slab is low, the suspension brackets 1B may be fixed to the suspension bolts 5. The selection of which of the suspension brackets 1A and the suspension brackets 1B is to be used for fixing can be made based on the height of the ceiling slab. Although, in FIG. 4, the suspension bracket 1A and the suspension bracket 1B are separated, they may be connected.

Embodiment 3

Figure 5:
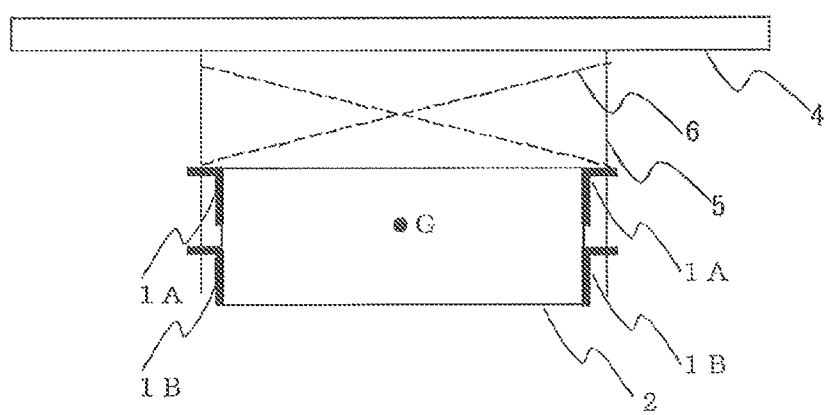
FIG. 5 is a diagram showing a state where a unit having unit attaching devices according to Embodiment 3 of he present invention is attached to a ceiling.

FIG. 5 is a diagram showing a state where a unit having unit attaching devices according to Embodiment 3 of the present invention is attached to a ceiling. In Embodiment 2 described above, suspension brackets 1 are installed on the upper side and the lower side of an indoor unit 2 (apparatus). In Embodiment 3, the suspension bracket 1A installed on the upper side of an indoor unit 2 and the suspension bracket 1B installed on the lower side of the indoor unit 2 are installed in such a manner that the suspension bracket 1A on the upper side and the suspension bracket 1B on the lower side are aligned in the height direction so that they can be fixed to the same suspension bolt 5, Therefore, the elongate hole 12 of the suspension bracket 1A and the elongate hole 12 of the suspension bracket 1B are disposed on the same axis.

For example, in Embodiment 2, eight suspension bolts 5 are needed. Since the suspension bracket 1A and the suspension bracket 1B are fixed to the same suspension bolt 5, the whole indoor unit 2 can be securely fixed only by performing fixation to four suspension bolts 5. In addition, because the suspension bolt 5 between the suspension bracket 1A and the suspension bracket 1B serves as a pillar, the suspension bolt 5 is securely fixed to the indoor unit 2, and the swing due to an earthquake or the like can be reduced. Here, also in Embodiment 3, both the suspension brackets 1A and the suspension brackets 1B are fixed to the suspension bolts 5. However, the present invention is not restricted to this. For example, only the suspension brackets 1A installed on the upper side may be fixed to the suspension bolts 5.

Embodiment 4

Figure 6:
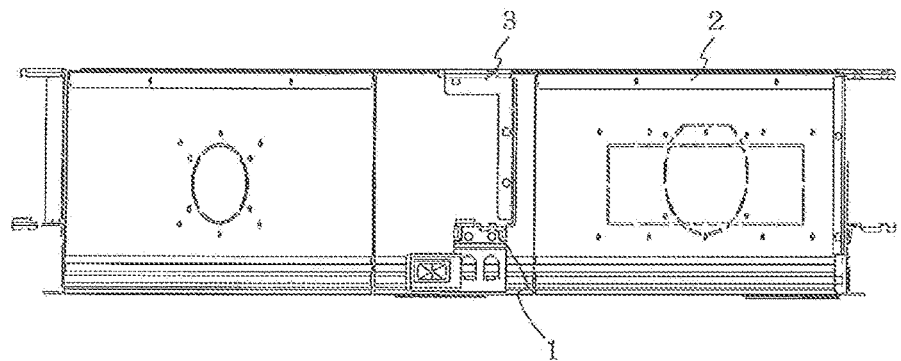
FIG. 6 is a diagram (1) showing a unit having unit attaching devices according to Embodiment 4 of the present invention.
Figure 7:
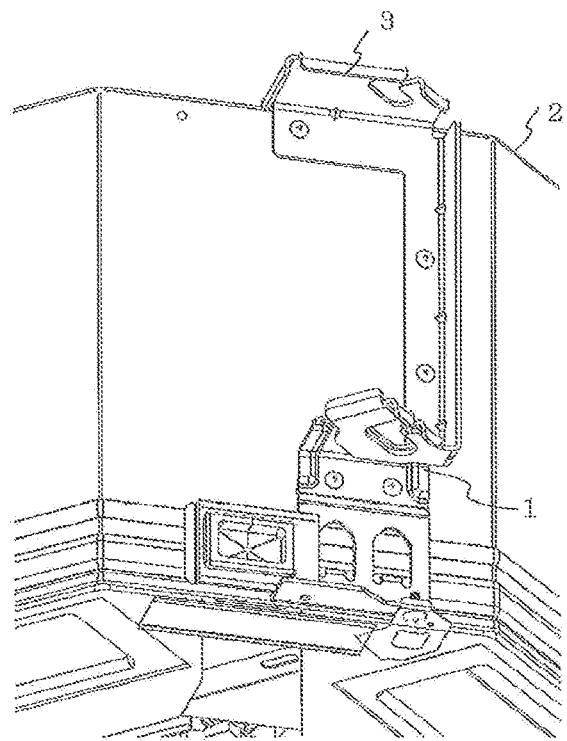
FIG. 7 is a diagram (2) showing a unit having unit attaching devices according to Embodiment 4 of the present invention.

FIG. 6 and FIG. 7 are diagrams showing a unit having unit attaching devices according to Embodiment 4 of the present invention. FIG. 6 is a view of a unit with the unit attaching device installation surface facing front. FIG. 7 is a view mainly showing the installation surface. Embodiment 4 is such that in addition to suspension brackets 1 installed to a unit, for example before shipping, at an installation site, additional suspension brackets 3 that can be additionally installed are installed as suspension brackets on the upper side.

Figure 8:
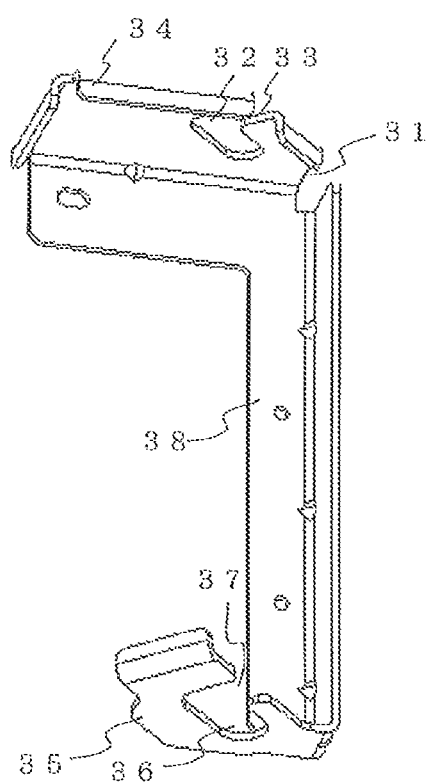
FIG. 8 is a diagram illustrating the structure of an additional suspension bracket 3 according to Embodiment 4 of the present invention.

FIG. 8 is a diagram illustrating the structure of an additional suspension bracket 3 according to Embodiment 4 of the present invention. As shown in FIG. 8, the additional suspension bracket 3 has a flat portion 31, an elongate hole 32, a slit 33, a washer retaining portion 34, a hooking portion 35, a hooking portion elongate hole 36, a hooking portion slit 37, and a connecting portion 38. The elongate hole 32 forms a space through which a suspension bolt 5 is passed, and the slit 33 is formed in the flat portion 31 to guide the suspension bolt 5 to the elongate hole 32. As with the suspension brackets 1 of Embodiment 1, when installed, the flat portion 31 is at substantially the same position in the height direction as a top plate of a housing of an indoor unit 2. The washer retaining portion 34 retains a washer to prevent the suspension bolt 5 from coming off.

The additional suspension bracket 3 has the hooking portion 35, which is hooked on and engaged with the lower surface of a flat portion 11 of a suspension bracket 1 installed on the lower side of the indoor unit 2 to become integral with the suspension bracket 1, and reinforces the additional suspension brackets 3. The hooking portion elongate hole 36 and the hooking portion slit 37 have shapes corresponding to an elongate hole 12 and a slit 13 of the suspension bracket 1 so as not to get in the way of the insertion of the suspension bolt 5 into the elongate hole 12. The connecting portion 38 connects the flat portion 31 and the hooking portion 35 and serves as an installation surface for installing the additional suspension bracket 3 to the indoor unit 2.

As described above, in Embodiment 4, the additional suspension bracket 3 is a unit attaching device, and therefore, at the installation site of the indoor unit 2 (apparatus), the additional suspension brackets 3 can be additionally installed as needed. The additional suspension bracket 3 has the hooking portion 35, and the hooking portion 35 is hooked on and integrated with the suspension bracket 1 installed to the indoor unit 2, and the additional suspension bracket 3 can thereby be reinforced. Although, in FIG. 7, a description has been made assuming that a unit attaching device installed on the upper side of the unit are added, a unit attaching device installed on the lower side of the unit may be added. Although both the additional suspension bracket 3 and the suspension bracket 1 are fixed to the suspension bolt 5, the present invention is not restricted to this. For example, if secure fixation is ensured, only the additional suspension bracket 3 installed on the upper side may be fixed to the suspension bolt 5.

Embodiment 5

In the embodiments described above, a description has been made assuming that a plurality of unit attaching devices (suspension brackets 1, additional suspension brackets 3) installed to a unit (indoor unit 2) are the same suspension brackets 1, additional suspension brackets 3. However, the present invention is not restricted to this. Because using the same unit attaching devices reduces the cost, it is preferable to use at least two same unit attaching devices.

In the embodiments described above, braces 6 are provided. However, in the case of a circumstance where braces 6 cannot be installed, braces 6 may not be provided. The present invention is restricted to attaching a unit, and does not relate to the specification of a suspension bolt, such as a brace.

Although the suspension bracket 1 has an elongate hole 12, a slit 13, and a washer retaining portion 14, a slit or the like may not be provided if at least a hole for passing a suspension bolt 5 is formed.

Embodiment 6

Figure 9:
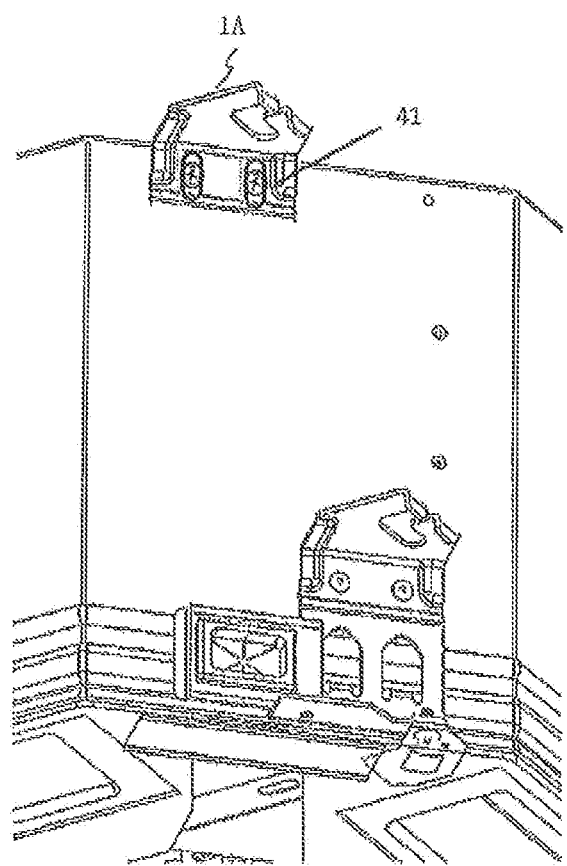
FIG. 9 is a diagram showing a unit to which unit attaching devices according to Embodiment 6 of the present invention are installed.

FIG. 9 is a diagram showing a unit to which unit attaching devices according to Embodiment 6 of the present invention are installed. Although not particularly specified in the unit attaching devices of the embodiments described above, in Embodiment 6, screw holes provided in a suspension bracket 1A for screwing the suspension bracket 1A to an indoor unit 2 are screwing elongate hole portions 41 having an elongate hole shape.

Since the screw holes for fixation screws fixing the suspension bracket 1A and the indoor unit 2 to each other have an elongate hole shape, the fixing position of the suspension bracket 1A can be changed relative to the indoor unit 2. Since the suspension bracket 1A can be changed, for example, the degree of freedom of the positional relationship of the position where the suspension bracket 1A and a suspension bolt 5 are fixed to each other can be increased without changing the positional relationship between the indoor unit 2 and the suspension bolt 5.

For example, by moving the suspension bracket 1A such that it is on the upper side of the indoor unit 2, and fixing it with screws, the fixing position of the suspension bracket 1 and the suspension bolt 5 is made as short as possible, and the reduction of the swing of the indoor unit 2 can be expected. This is not restricted to the case where the suspension bracket 1 is movable, and the suspension bracket 1 may be fixed on the upper side of the indoor unit 2 in advance.

FIG. 9 shows providing elongate holes in such a manner that the elongate holes of the screwing elongate hole portions 41 extend in the direction of gravitational force (vertical direction) so that the positional relationship can be adjusted in the vertical direction. However, the present invention is not restricted to this. For example, by providing elongate holes in such a manner that they extend in the horizontal direction (left-right direction), the adjustment of the positional relationship in the horizontal direction may be enabled. Alternatively, cross-shaped holes such that two elongate holes extending in the direction of gravitational force and the horizontal direction are combined may be provided. Since the elongate holes extend in the horizontal direction, the indoor unit 2 can be installed without changing the positions of the existing suspension bolts 5 attached to a ceiling 4.

INDUSTRIAL APPLICABILITY

In the embodiments described above, a cassette-type indoor unit 2 concealed and installed in a ceiling 4 has been described as a unit to be suspended to which suspension brackets 1 or additional suspension brackets 3 that are unit attaching devices are installed. However, the present invention is not restricted to this. The indoor unit 2 need not be of the concealed type if it is of the ceiling suspended type. The present invention can be applied not only to suspending an indoor unit but also to suspending a lighting unit, an acoustic unit, and the like.

REFERENCE SIGNS LIST

1, 1A, 1B suspension bracket 2 indoor unit 3 additional suspension bracket 4 ceiling 5 suspension bolt 6 brace 11 flat portion 12 elongate hole 13 slit 14 washer retaining portion 15 vertical portion 31 flat portion 32 elongate hole 33 slit 34 washer retaining portion 35 hooking portion 36 hooking portion elongate hole 37 hooking portion slit 38 connecting portion 41 screwing elongate hole portion

The invention claimed is:

1. A unit attaching device comprising
a first suspension bracket having a first hole adapted to pass a suspension bolt suspended from a ceiling and installed to a unit to be suspended, and
a second suspension bracket having a second hole adapted to pass the suspension bolt,
wherein the first suspension bracket has a first flat portion having the first hole,
wherein the second suspension bracket has
a second flat portion having the second hole,
a hooking portion having a flat surface, and
a connecting portion that connects the second flat portion and the hooking portion,
wherein the first suspension bracket is installed on one of a ceiling side and a floor side of a side surface of a housing of the unit and the second suspension bracket is installed on an other of the ceiling side and the floor side of the side surface of the housing of the unit, and
the flat surface of the hooking portion of the second suspension bracket is superposed onto the first flat portion of the first suspension bracket such that the first suspension bracket and the second suspension bracket are engaged.

2. The unit attaching device of claim 1, wherein at least two of the first and second suspension brackets installed at a plurality of locations on the unit are same suspension brackets.

3. The unit attaching device of claim 1, wherein the first and second suspension brackets have a screwing elongate hole for screwing to the housing of the unit.

4. An indoor unit being the unit to be suspended and to which the unit attaching device of claim 1 is installed.

5. The unit attaching device of claim 1, wherein
each of the first hole and the second hole is elongate in a first direction perpendicular to the suspension bolt, and
each of the first and second suspension brackets has a slit that communicates with the elongate hole in a second direction perpendicular to the suspension bolt, the second direction is eccentric to the first direction.

6. The unit attaching device of claim 1, wherein
the second flat portion of the second suspension bracket installed on the ceiling side of the unit and a top plate of the unit are at substantially the same position in the height direction.

7. A unit with unit attaching device, comprising:
a unit to be suspended, and
the unit attaching device of claim 1 installed on the unit.

8. The unit attaching device of claim 1, wherein
the flat surface of the hooking portion of the second suspension bracket has a third hole adapted to pass the suspension bolt, and
the third hole of the second suspension bracket is formed so that the third hole overlaps with the first hole of the first suspension bracket in a state in which the first suspension bracket and the second suspension bracket are engaged.

* * * * *